(12) United States Patent
Lindsay et al.

(10) Patent No.: US 12,352,531 B2
(45) Date of Patent: *Jul. 8, 2025

(54) WEAPON ANTI-CANT INDICATOR

(71) Applicant: AOB Products Company, Columbia, MO (US)

(72) Inventors: Mike Lindsay, Columbia, MO (US); Michael Cottrell, Ashland, MO (US); James Tayon, Moberly, MO (US); Timothy S. Kinney, Warrenton, MO (US); Mark Dalton, Columbia, MO (US); Brian Steere, Columbia, MO (US); Justin Burke, Columbia, MO (US); Kyle Martin, Columbia, MO (US); Dennis W. Cauley, Jr., Fayette, MO (US); Anthony Vesich, Columbia, MO (US); Ryan Varnum, Columbia, MO (US); Seth Wheeler, Columbia, MO (US); Brett Eckelkamp, Fulton, MO (US); Matthew Kinamore, Columbia, MO (US); Curtis Smith, Columbia, MO (US)

(73) Assignee: AOB Products Company, Columbia, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,311

(22) Filed: Nov. 10, 2023

(65) Prior Publication Data
US 2024/0077282 A1    Mar. 7, 2024

Related U.S. Application Data

(63) Continuation of application No. 17/123,710, filed on Dec. 16, 2020, now Pat. No. 11,852,441.

(Continued)

(51) Int. Cl.
  *F41G 1/44* (2006.01)
  *F41G 11/00* (2006.01)
  *G01C 9/34* (2006.01)

(52) U.S. Cl.
  CPC .............. *F41G 1/44* (2013.01); *F41G 11/003* (2013.01); *G01C 9/34* (2013.01)

(58) Field of Classification Search
  CPC ....................................................... F41G 1/44
  (Continued)

(56) References Cited

U.S. PATENT DOCUMENTS

| 5,406,733 A | 4/1995 | Tarlton et al. |
| 5,878,504 A | 3/1999 | Harms |

(Continued)

*Primary Examiner* — George B Bennett
(74) *Attorney, Agent, or Firm* — Stinson LLP

(57) ABSTRACT

An anti-cant indicator assembly, components thereof, and associated methods. The anti-cant indicator assembly indicates the orientation of a weapon with respect to vertical. The anti-cant indicator assembly includes a mount configured to mount to the weapon, a level including a vial containing a bubble and a pivot connection connecting the level to the mount. The pivot connection is configured to permit movement of the level with respect to the mount about the pivot connection between an operational position in which the bubble can be referenced by the user for indicating orientation of the weapon with respect to vertical, and a stowed position different from the operational position. The pivot connection can include a retainer configured to releasably retain the level in at least one of the operational position or the stowed position. The level can be selectively movable with respect to the mount to calibrate the anti-cant indicator.

40 Claims, 8 Drawing Sheets

Related U.S. Application Data

(60) Provisional application No. 62/948,618, filed on Dec. 16, 2019.

(58) Field of Classification Search
USPC .......................................................... 33/265
See application file for complete search history.

(56) References Cited

U.S. PATENT DOCUMENTS

| | | | |
|---|---|---|---|
| 6,813,855 B2 | 11/2004 | Pinkley | |
| 8,069,577 B1 * | 12/2011 | Willman | F41G 1/467 |
| | | | 33/297 |
| 8,186,068 B2 * | 5/2012 | Pulkrabek | F41G 1/467 |
| | | | 33/297 |
| 8,661,696 B2 * | 3/2014 | Pulkrabek | F41B 5/14 |
| | | | 124/87 |
| 8,819,985 B1 * | 9/2014 | McCoy | F41G 11/001 |
| | | | 42/111 |
| 9,015,982 B1 | 4/2015 | Powers | |
| 9,103,632 B1 * | 8/2015 | Larson | F41G 1/467 |
| 10,767,964 B1 * | 9/2020 | Echols | F41G 11/001 |
| 11,852,441 B2 * | 12/2023 | Lindsay | F41G 11/003 |
| 2006/0201005 A1 * | 9/2006 | Lueck | F41G 1/467 |
| | | | 33/265 |
| 2007/0113460 A1 | 5/2007 | Potterfield et al. | |
| 2011/0271535 A1 | 11/2011 | Varner et al. | |
| 2021/0325148 A1 * | 10/2021 | Jones | F41G 1/467 |

* cited by examiner

WEAPON ANTI-CANT INDICATOR

CROSS-REFERENCE TO RELATED APPLICATION

The present application is a continuation of U.S. patent application Ser. No. 17/123,710, filed Dec. 16, 2020, which claims priority to U.S. Provisional Patent Application No. 62/948,618, filed Dec. 16, 2019, each of which is hereby incorporated by reference in its entirety.

FIELD

The present disclosure generally relates to firearm accessories, and more particularly to a weapon anti-cant indicator.

BACKGROUND

Various types of weapons (e.g., firearms) include sights for aiming the weapons toward a target downrange. In general, it is desirable to avoid canting a weapon such as a rifle so that a sight of the rifle is directly above a bore of the rifle.

SUMMARY

In one aspect, an anti-cant indicator assembly is for indicating the orientation of a weapon with respect to vertical. The anti-cant indicator assembly includes a mount configured to mount to the weapon, a level including a vial containing a bubble, and a pivot connection connecting the level to the mount. The pivot connection is configured to permit movement of the level with respect to the mount about the pivot connection between an operational position in which the bubble can be referenced by the user for indicating orientation of the weapon with respect to vertical, and a stowed position different from the operational position. The pivot connection includes a retainer configured to releasably retain the level in at least one of the operational position or the stowed position.

In another aspect, an anti-cant indicator assembly is for indicating the orientation of a weapon with respect to vertical. The anti-cant indicator assembly includes a mount configured to mount to the weapon. The anti-cant indicator includes a bracket and a vial containing a bubble. The bracket is connected to the mount. A pivot connection connects the vial to the bracket. The pivot connection is configured to permit movement of the vial with respect to the bracket and the mount about the pivot connection between an operational position in which the bubble can be referenced by a user for indicating orientation of the weapon with respect to vertical, and a stowed position different from the operational position. The bracket is selectively movable with respect to the mount to change an orientation of the vial with respect to the mount in the operational position.

In another aspect, the anti-cant indicator assembly is for indicating the orientation of a weapon with respect to vertical. The weapon includes a forward end which a user points toward a target for aiming the weapon at the target. The anti-cant indicator assembly includes a mount configured to mount to the weapon. The mount includes a forward portion and a rearward portion. The forward portion is arranged to be in front of the rearward portion when the mount is mounted on the firearm. The anti-cant indicator includes a level including a vial containing a bubble, and a pivot connection connecting the vial to the mount. The pivot connection is configured to permit movement of the vial with respect to the mount and the weapon about the pivot connection between an operational position in which the bubble can be referenced by a user for indicating orientation of the weapon with respect to vertical, and a stowed position different from the operational position. The pivot axis of the pivot connection extends in a rearward-to-forward orientation with respect to the mount.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
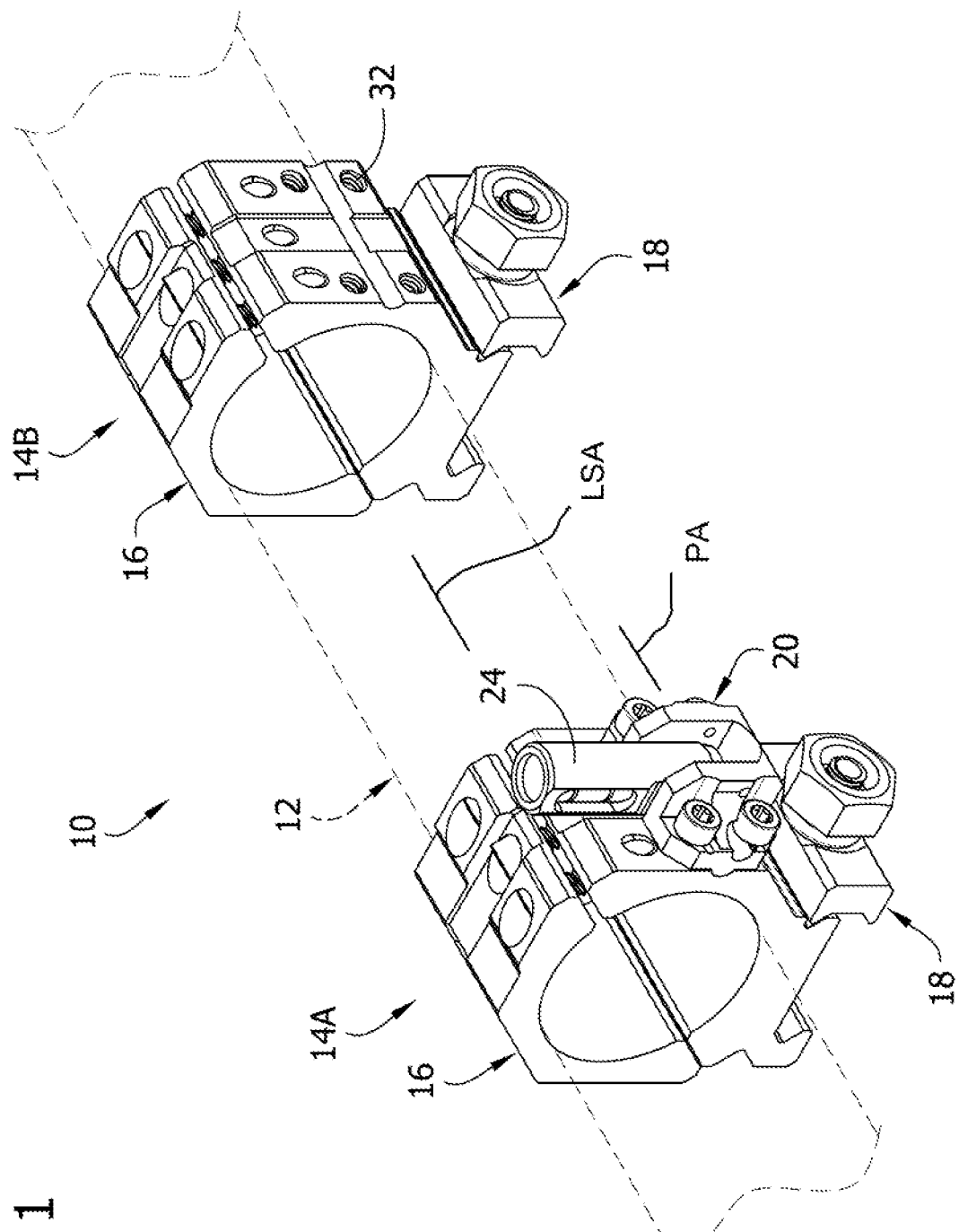
FIG. 1 is a perspective of a first embodiment of a weapon aiming accessory of the present disclosure.

Referring to FIG. 1, a weapon aiming accessory (broadly, "anti-cant indicator assembly") of the present disclosure is indicated generally by 10. In the illustrated embodiment, the weapon aiming accessory 10 comprises a sight 12 (e.g., scope) and at least one mount 14 for mounting the sight on a weapon such as a firearm. The user aims the weapon by generally looking down a longitudinal sighting axis LSA to point a forward end (e.g., muzzle) of the weapon toward a target for aiming the weapon at the target. As explained in further detail below, the weapon aiming accessory 10 includes an anti-cant indicator 20 for indicating whether the weapon is canted with respect to vertical.

In the illustrated embodiment, two mounts 14A, 14B are provided. The first and second mounts 14A, 14B each comprise a sight connector 16 for connecting the sight 12 to the mounts. In the illustrated embodiment, the sight connectors 16 form rings for connecting the sight 12 to the mounts 14A, 14B. The mounts each include a main body 13 defining a first portion of the ring, and a secondary body 15 defining a second portion of the ring connectable to the main body by fasteners 17 (e.g., bolts) for forming the ring. The sight 12 is connected to the mounts 14A, 14B by locating respective portions of the sight between the ring portions and connecting the ring portions to each other with the fasteners 17. Other types of sight connectors can be used without departing from the scope of the present disclosure. Moreover, the sight connectors may be omitted, and/or the sight may be formed integrally with the mounts.

The mounts 14A, 14B also each comprise a weapon connector 18 for connecting the mounts 14A, 14B and thus the sight 12 to the weapon. In the illustrated embodiment, the weapon connectors 18 comprise clamps configured to clamp to the weapon (e.g., to a dovetail rail of the weapon). A first jaw 18A of the clamp is defined by the main body 13. A second jaw 18B is movable with respect to the first jaw 18A and is connected to the main body 13 by a fastener 19 (e.g., bolt). The first and second jaws 18A, 18B can be drawn toward each other to decrease a space between the jaws to clamp on the rail of the weapon. In the illustrated embodiment, this is done by threading a nut 19A onto the fastener 19 to push the jaws 18A, 18B toward each other. Other types of weapon connectors (e.g., other types of clamps, etc.) can be used without departing from the scope of the present disclosure.

As shown in FIG. 1, the first mount 14A may be used to mount a rear portion of the sight 12 to a weapon, and the second mount 14B may be used to mount a forward portion of the sight 12 to the weapon. The mounts 14A, 14B have respective forward end portions (facing to the right in FIG. 1) and rearward end portions (facing to the left in FIG. 1). The forward end portion of the rear mount 14A faces toward the rearward end portion of the forward mount 14B. In other words, the forward end portion of each mount 14A, 14B is arranged to be in front of the mount's rearward end portion when the mount 14A, 14B is mounted on the firearm.

In other embodiments, the sight connectors 16 may be connected (e.g., releasably connected or fixed) to a shared bracket (not shown) having one or more weapon connectors 18 for connecting the bracket and thus the sight 12 to the firearm. Other configurations can be used without departing from the scope of the present disclosure.

While aiming the weapon (e.g., looking generally down the longitudinal sighting axis LSA), the user may desire to know whether the weapon is canted with respect to vertical. To facilitate the user properly orienting the weapon, the assembly 10 includes the anti-cant indicator 20. The anti-cant indicator 20 includes a mounting bracket 22 (broadly, mount or support), an arm 24 pivotably connected to the mounting bracket, and a level vial 26 supported by the arm. The arm 24 and vial 26 can be referred to broadly as a level.

The main body 13 defines anti-cant indicator support structure to which the mounting bracket 22 is connectable by two upper fasteners 28A and two lower fasteners 28B (e.g., bolts) passing through openings 30 in the mounting bracket 22. The fasteners 28B are threadably received in openings 32 in the main body 13.

Figure 2:
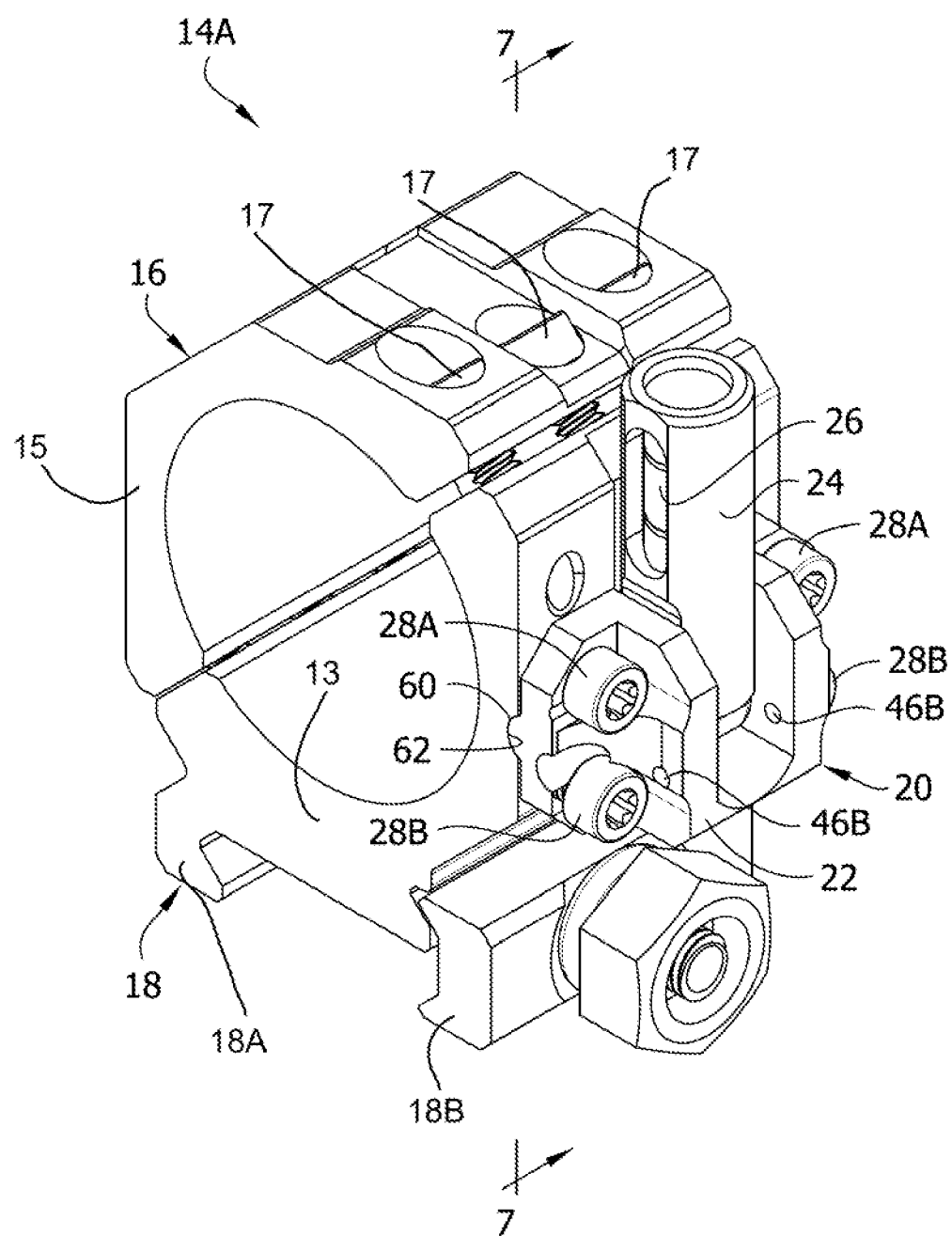
FIG. 2 is a perspective of a mount and anti-cant indicator of the weapon aiming accessory of FIG. 1.
Figure 3:
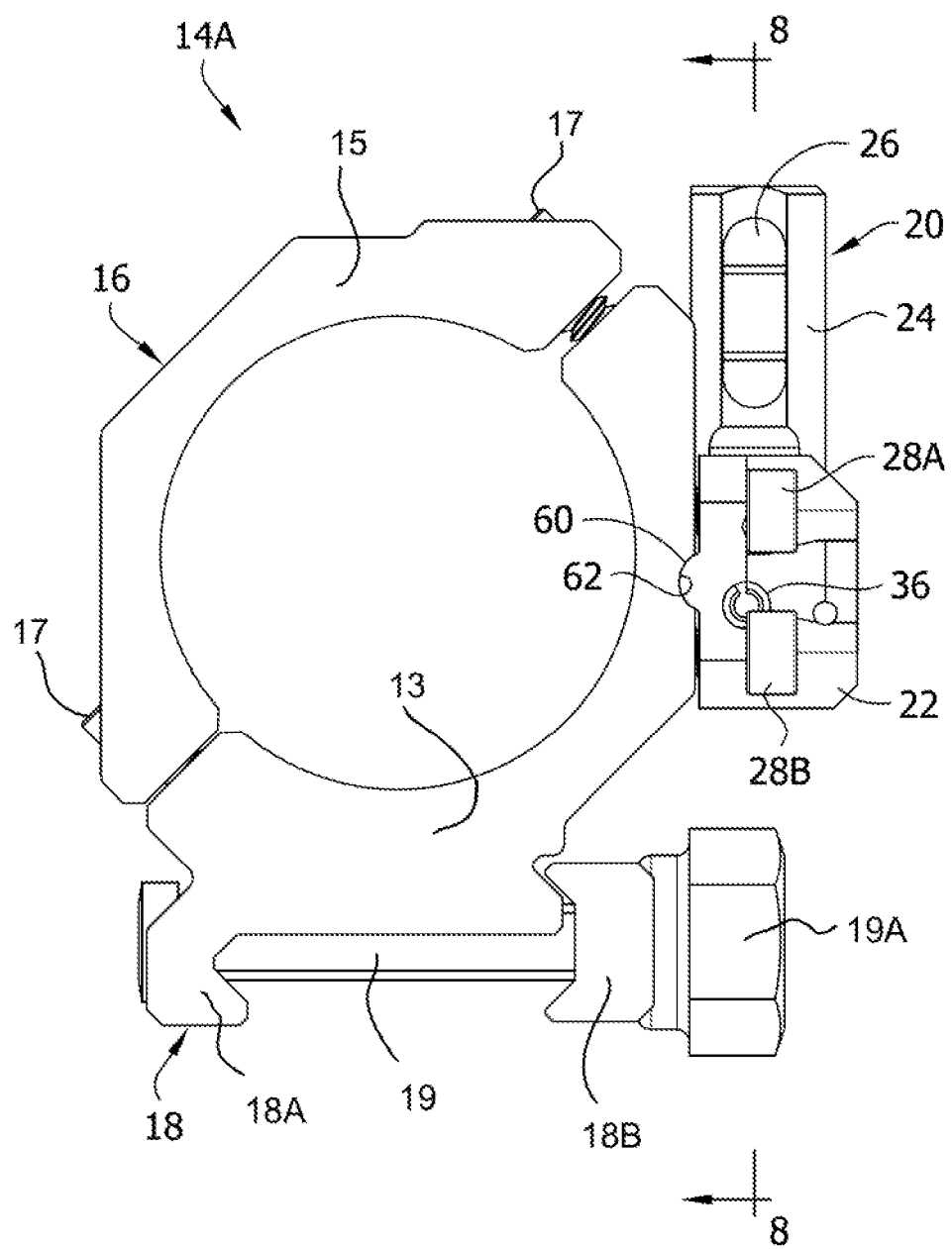
FIG. 3 is a rear elevation of the mount of FIG. 2, the anti-cant indicator being shown in a stowed position.

The arm 24 is pivotable with respect to the mount 14A from a stowed position (e.g., FIGS. 2, 3) in which the arm extends upward, to an operational (e.g., deployed) position (e.g., FIG. 4) in which the arm extends laterally. The arm 24 is connected to the bracket 22 by a pivot connection. A proximal end of the arm 24 (defining a first pivot connector) is connected to the bracket 22 by a pin 36 extending through the arm and into two portions of the mounting bracket 22 (defining a second pivot connector) on opposite forward and rearward sides of the arm. The arm 24 is pivotable about a pivot axis PA defined by the pin 36. The pivot axis PA extends in a rearward-to-forward orientation with respect to the arm 24 and the mount 14A. The pivot axis PA is transverse to the longitudinal axis LA of the vial. Moreover, the pivot axis PA extends generally parallel with the longitudinal sighting axis of the weapon or sight 12 when the mount is mounted on the weapon. The arm 24 is pivotable about the pivot axis PA in a pivot plane extending transversely with respect to the longitudinal sighting axis of the weapon or sight 12. Other arrangements can be used without departing from the scope of the present disclosure.

The anti-cant indicator 20 includes retaining structure (broadly, at least one retainer) on at least one of the arm 24 and/or the mounting bracket 22 configured to retain the arm in the stowed position and in the operational position. In the illustrated embodiment, arm 24 has a proximal end defining a first pivot connector, and the bracket 22 defines a second pivot connector. The retaining structure comprises two balls 40 (broadly, "detents") captured in a bore in the arm 24 and biased in opposite directions by a spring 42 in the bore between the balls. The mounting bracket 22 includes two pairs of openings 46A, 46B (broadly, "retainer recess"). One pair of openings 46A receives respective ones of the spring biased balls 40 in the stowed position. The other pair of openings 46B receives the spring biased balls 40 in the operational position. The balls 40 when received in the openings 46A, 46B resist movement of the arm 24 out of the respective stowed or operational position. Application of force on the arm 24 tending to pivot the arm out of the stowed position toward the operational position can overcome the bias of the spring 42 (permitting the balls 40 to move inward, toward each other) to dislodge the balls from the openings 46A and permit pivoting of the arm 24 to the operational position, where the balls are forced by the spring into the other pair of openings 46B. Conversely, application of force on the arm 24 tending to pivot the arm out of the operational position toward the stowed position can overcome the bias of the spring 42 to dislodge the balls 40 from the openings 46B and permit pivoting of the arm to the stowed position, where the balls are forced by the spring into the other pair of openings 46A.

It will be appreciated that the pivot connection of the arm 24 permits the arm to be selectively moved between the stowed and operational positions. In the stowed position, the arm 24 is relatively streamlined with the bracket 22 and mount 14A and is braced above the pivot connection by portions of the bracket 22 in front of and behind the arm. In the operational position, the arm 24 protrudes a greater amount from the bracket 22 and is viewable to the side of the sight 12 as the user looks generally down an aiming axis of the sight to aim the weapon. The pivot connection of the arm 24 to the mount 14A is provided at a lateral side of the main body 13 below a top of the main body and above a bottom of the main body, such that in the operational position the arm (and the longitudinal axis LA of the vial) extends laterally away from the side of the main body in a space laterally of the sight connector 16 below the top of the sight connector and above the bottom of the sight connector, such that the bubble 50 is below the top of the mount.

Figure 4:
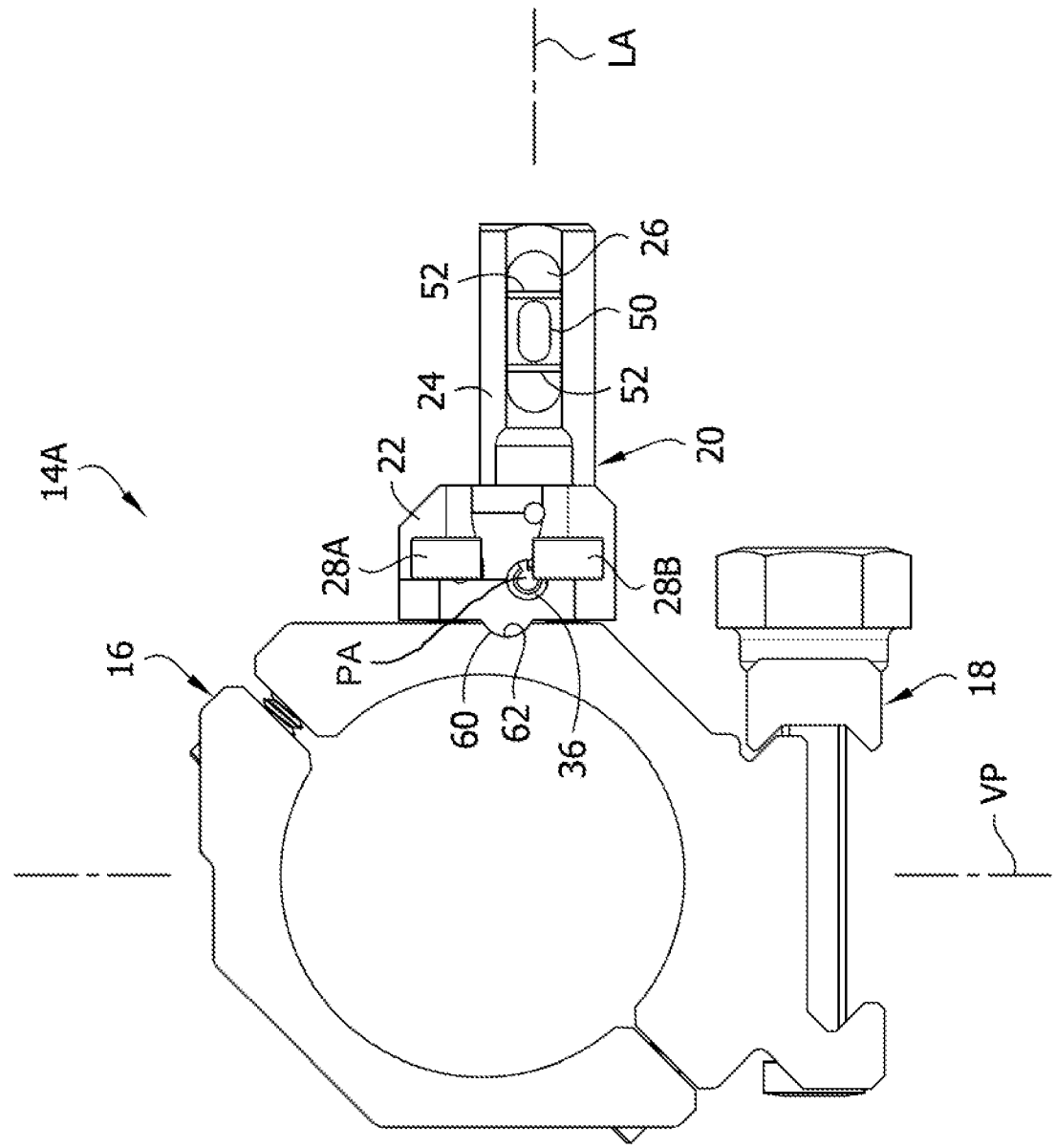
FIG. 4 is a rear elevation similar to FIG. 3 but showing the anti-cant indicator in an operational position.
Figure 5:
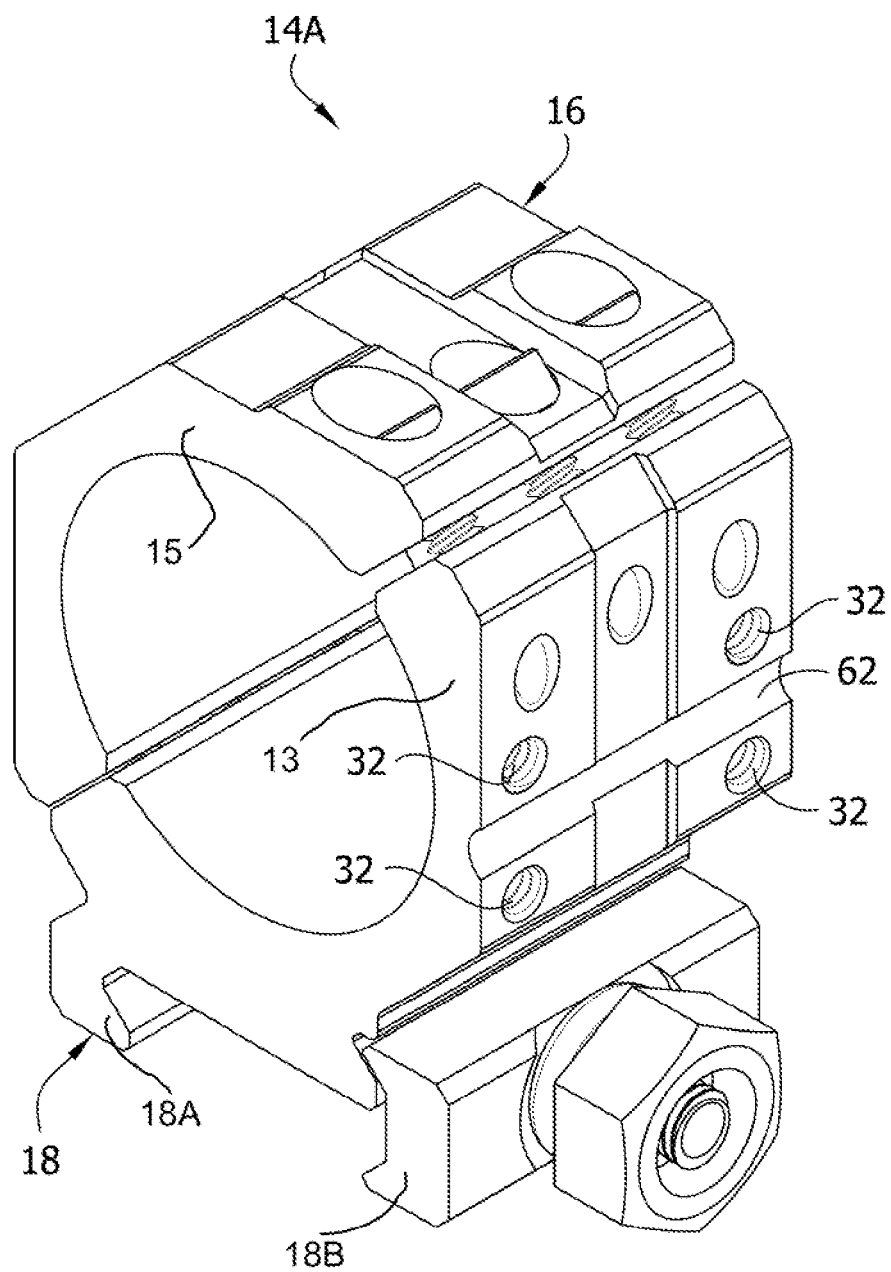
FIG. 5 is a perspective of the mount of FIG. 2 having the anti-cant indicator removed.
Figure 6:
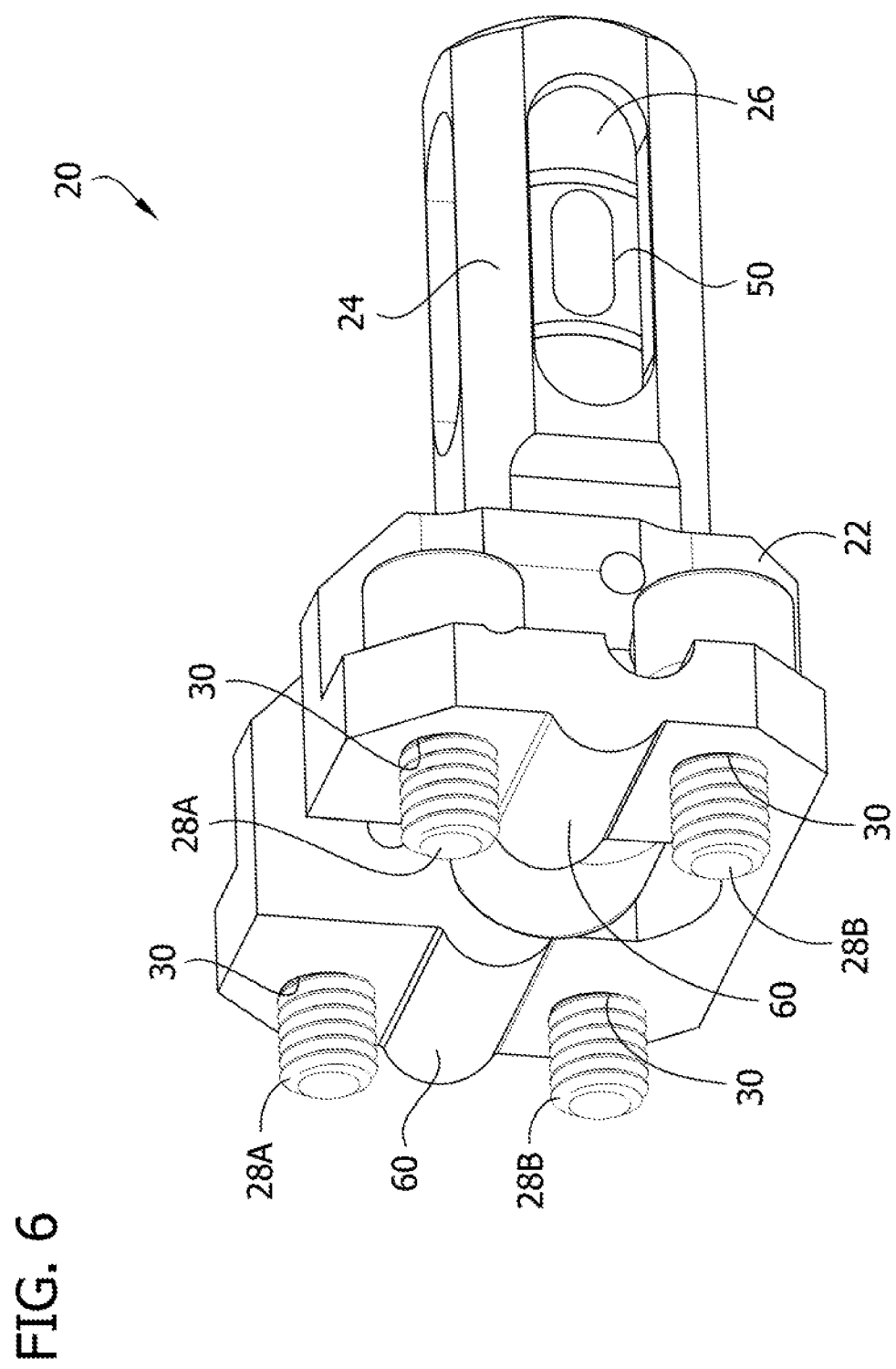
FIG. 6 is a perspective of the anti-cant indicator.
Figure 7:
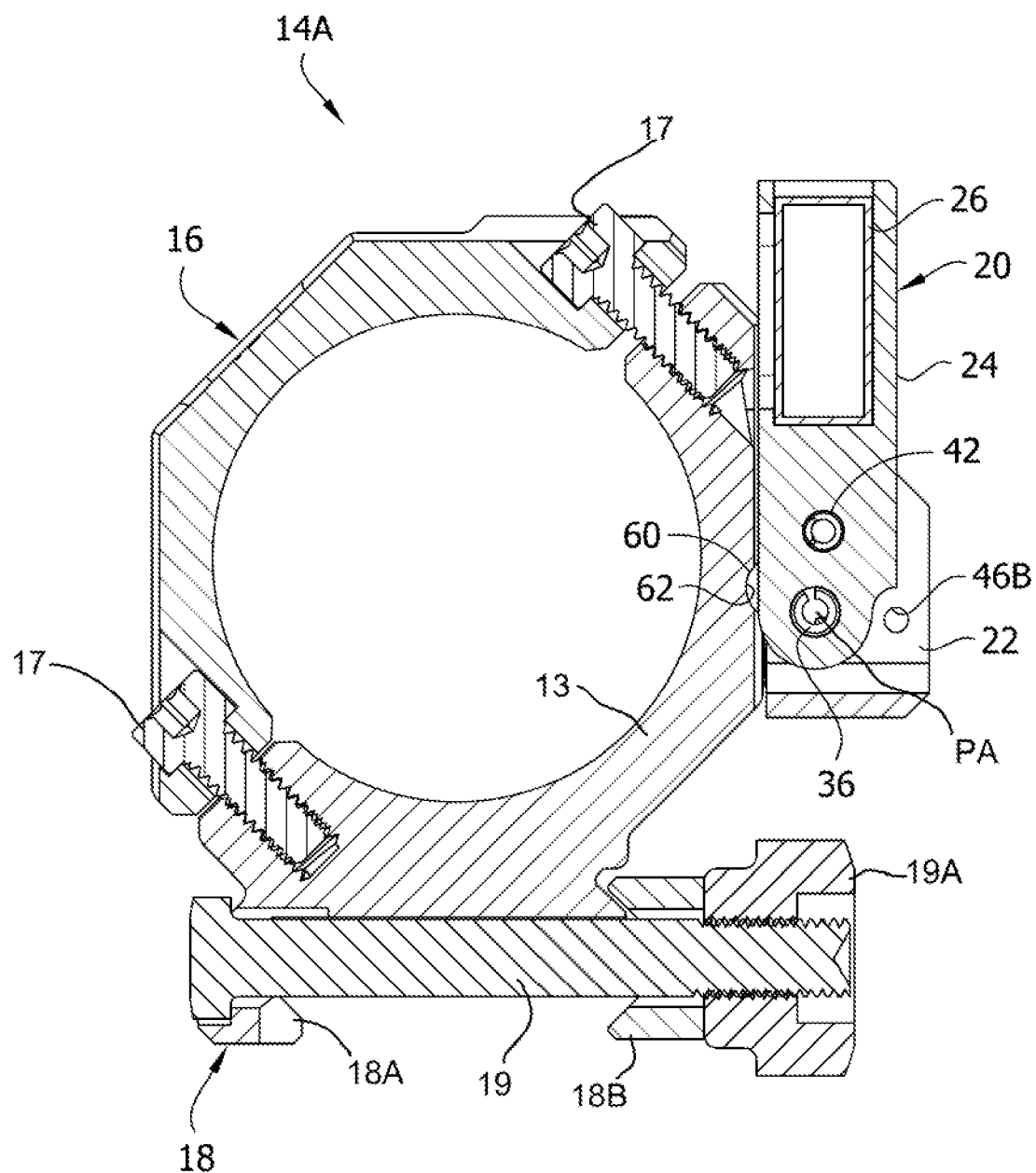
FIG. 7 is a section of the mount taken in a plane including 7-7 of FIG. 2.
Figure 8:
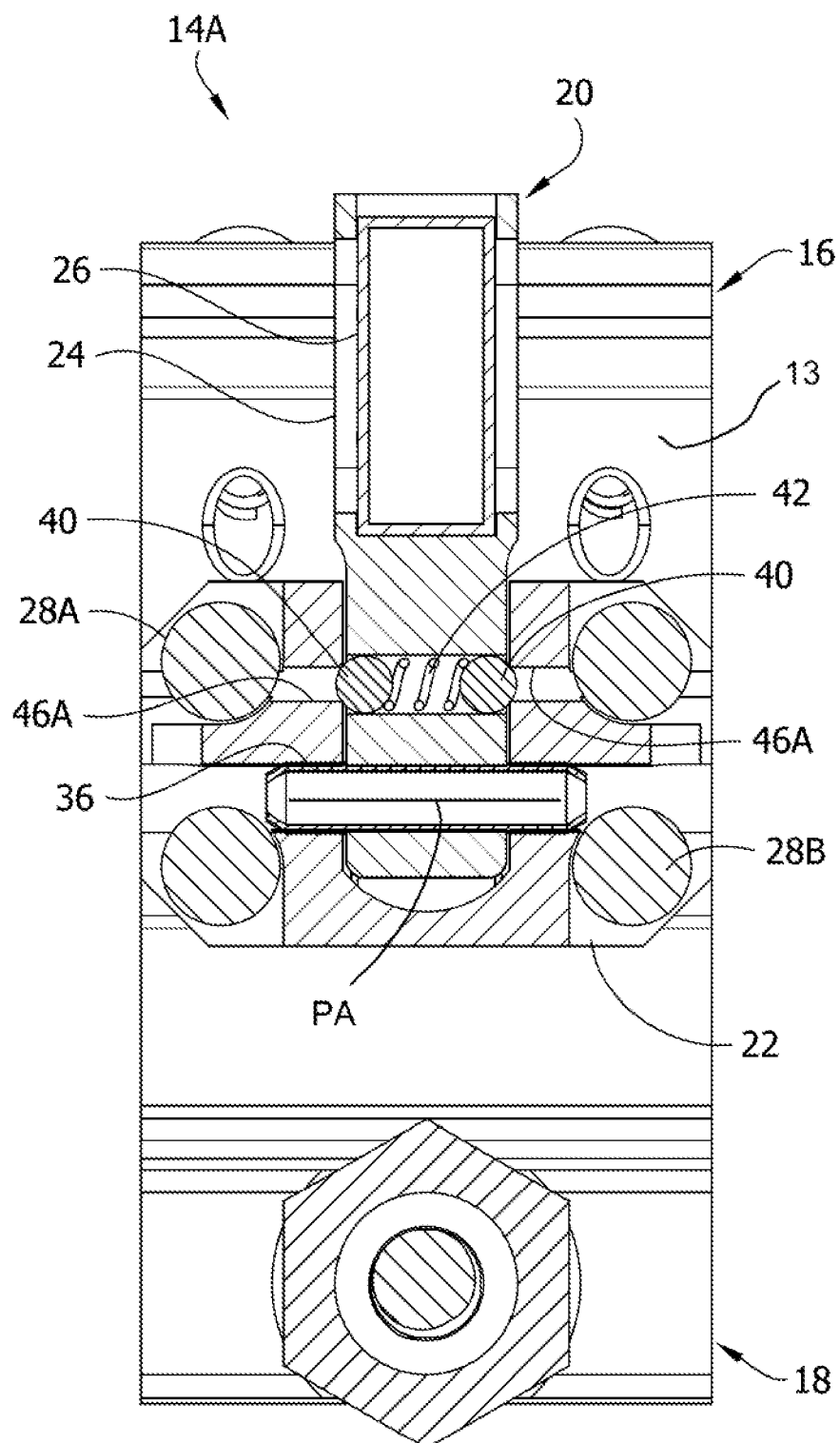
FIG. 8 is a section of the mount taken in a plane including 8-8 of FIG. 3.

Referring to FIG. 4, when the arm 24 is in the deployed position, the user can reference a bubble 50 (broadly, "anti-cant gauge") in the level vial 26 to determine whether the weapon is oriented properly with respect to vertical. For example, if the bubble 50 in the level vial 26 is between two lines 52 (broadly, one or more "references") on the level vial 26, the anti-cant indicator 20 indicates the firearm is vertical (not canted). On the other hand, if the bubble 50 is not between the two lines 52, the anti-cant indicator 20 indicates the firearm is canted and should be better oriented by the user for optimal performance of the weapon.

The anti-cant indicator 20 is adjustable to calibrate the anti-cant indicator 20 with respect to the mount 14A and the particular weapon on which the aiming accessory 10 is mounted. The level vial 26 extends laterally along a level vial axis LA when the arm 24 is in the operational position. In some instances, the level vial axis LA may need to be adjusted to be square with respect to a vertical reference plane VP of the firearm so that the anti-cant indicator properly indicates cant of the firearm. To permit such adjustment, the mounting bracket 22 of the anti-cant indicator 20 is adjustably connected to the anti-cant indicator support structure of the main body 13. The mounting bracket 22 and main body 13 include respective pivot engagement surfaces at which the mounting bracket and main body engage each other. In the illustrated embodiment, the mounting bracket 22 includes first and second ribs 60 defining respective male arcuate (broadly, "convex") pivot engagement surfaces, and the main body includes a channel 62 defining a female arcuate (broadly, "concave") pivot engagement surface. The ribs 60 are received in the channel 62, and the mounting bracket 22 is pivotable with respect to the main body 13 by pivoting the mounting bracket 22 about the ribs received in the channel. To permit pivoting of the mounting bracket 22, the fasteners 28A, 28B can be loosened (unthreaded). To maintain the mounting bracket 22 in a desired position, the fasteners 28A, 28B are tightened (threaded in). It will be appreciated that the channel 62 can be on the mounting bracket 22 and the rib 60 on the ring 16, and other types of pivot engagement surfaces (or other types of pivot connections) can be used without departing from the scope of the present disclosure.

In one method of adjusting the anti-cant indicator 20, the firearm is positioned in a vise so that the weapon is held securely in a non-canted orientation as can be determined by supporting a calibration level (not shown) on a surface (e.g., bolt ways) of the firearm known to have a horizontal orientation with respect to the firearm. When the firearm is in the non-canted orientation (as indicated by the calibration level), the anti-cant indicator 20 can be adjusted to calibrate for proper anti-cant indication. In particular, the upper and/or lower fasteners 28A, 28B can be loosened to permit the mounting bracket 22 to pivot with respect to the mount 14A. Desirably, the mounting bracket 22 engages the main body 13 only at the pivot engagement surface 60 (within a range of pivoting) such that the mounting bracket is not obstructed from pivoting to calibrate the level vial axis LA. In one example, the lower fasteners 28B are unthreaded, and then the upper fasteners 28A are threaded in or out (and/or the bracket 22 or arm 24 is manually manipulated by the user) to cause the mounting bracket 22 to pivot about the engagement of the ribs 60 with the channel 62. When the level vial axis LA is horizontal (e.g., bubble indicating no cant), the lower fasteners 28B (and, if necessary, the upper fasteners 28A) are threaded in to secure the anti-cant indicator 20 in the calibrated configuration. In the calibrated configuration, the fasteners 28A, 28B cause the ribs 60 of the mounting bracket 22 press against the channel 62 of the main body 13, and the mounting bracket is otherwise slightly spaced from the main body.

It will be appreciated that the weapon aiming accessory can be referred to as an anti-cant indicator assembly. Although the illustrated embodiment is configured to mount a sight to a weapon, in other embodiments the anti-cant indicator assembly may not mount a sight to the weapon. For example, the anti-cant indicator assembly may mount only the anti-cant indicator to the weapon.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An anti-cant indicator assembly for indicating orientation of a weapon sight with respect to vertical, said anti-cant indicator assembly including:
a weapon sight connector configured to mount to the weapon sight;
a level including a vial containing a bubble;
a pivot connection connecting the level to the weapon sight connector, the pivot connection being configured to permit movement of the level with respect to the weapon sight connector about the pivot connection between an operational position in which the bubble can be referenced by the user for indicating orientation of the weapon sight with respect to vertical, and a stowed position different from the operational position, the pivot connection including a retainer configured to releasably retain the level in at least one of the operational position or the stowed position.

2. The anti-cant indicator assembly as set forth in claim 1, wherein the retainer comprises a detent.

3. The anti-cant indicator assembly as set forth in claim 2, wherein the level is movable about the pivot connection in a first direction to move the level from the operational position to the stowed position, and the detent is releasable by application of force on the level tending to move the level in the first direction.

4. The anti-cant indicator assembly as set forth in claim 2, wherein the pivot connection includes a recess in which the detent is receivable to releasably retain the level in the operational position.

5. The anti-cant indicator assembly as set forth in claim 2, wherein the detent is spring biased into a retaining position in which the detent releasably retains the level in the operational position.

6. The anti-cant indicator assembly as set forth in claim 5, wherein the level is movable about the pivot connection in a first direction to move the level from the operational position to the stowed position, and the detent is movable out of the retaining position against the spring bias by application of force on the level tending to move the level in the first direction.

7. The anti-cant indicator assembly as set forth in claim 1, wherein the pivot connection is configured to releasably retain the level in the stowed orientation.

8. The anti-cant indicator assembly as set forth in claim 1, wherein at least one of the weapon sight connector and the level includes a first pivot connector and the other of the weapon sight connector and the level includes a second pivot connector, the first and second pivot connectors secured to each other and at least partially defining the pivot connection.

9. The anti-cant indicator assembly as set forth in claim 8, wherein at least one of the first and second pivot connectors includes the retainer and the other of the first and second pivot connectors includes a retainer recess sized to at least partially receive the retainer to releasably retain the level in said at least one of the operational position or the stowed position.

10. The anti-cant indicator assembly as set forth in claim 9, wherein the retainer is biased into the retainer recess.

11. The anti-cant indicator assembly as set forth in claim 1, further comprising a weapon connector configured to mount the anti-cant indicator assembly to a weapon, the weapon connector supporting the weapon sight connector.

12. The anti-cant indicator assembly as set forth in claim 11, wherein the anti-cant indicator is connected to the weapon sight connector on a lateral side of the weapon sight connector, and, in the operational position, a longitudinal axis of the vial extends laterally away from the weapon sight connector and the bubble is located below a top of the weapon sight connector.

13. An anti-cant indicator assembly for indicating orientation of a weapon sight with respect to vertical, said anti-cant indicator assembly including:
    a weapon sight connector configured to mount to the weapon sight;
    an anti-cant indicator including a bracket and a vial containing a bubble, the bracket connected to the weapon sight connector;
    a pivot connection connecting the vial to the bracket, the pivot connection being configured to permit movement of the vial with respect to the bracket and the weapon sight connector about the pivot connection between an operational position in which the bubble can be referenced by a user for indicating orientation of the weapon sight with respect to vertical, and a stowed position different from the operational position;
    wherein the bracket is selectively movable with respect to the weapon sight connector to change an orientation of the vial with respect to the weapon sight connector in the operational position.

14. The anti-cant indicator assembly of claim 13, wherein the bracket is connected to the weapon sight connector on a lateral side of the weapon sight connector, and, in the operational position, a longitudinal axis of the vial extends laterally away from the weapon sight connector and the bubble is located below a top of the weapon sight connector.

15. The anti-cant indicator assembly of claim 13, wherein the bracket is pivotable with respect to the weapon sight connector about a pivot axis extending generally transverse with respect to a longitudinal axis of the vial.

16. An anti-cant indicator assembly for indicating orientation of a weapon sight with respect to vertical, said weapon sight including a forward end which a user points toward a target for aiming the weapon sight at the target, said anti-cant indicator assembly including:
    a weapon sight connector configured to mount to the weapon sight, the weapon sight connector including a forward portion and a rearward portion, the forward portion arranged to be in front of the rearward portion when the weapon sight connector is mounted on the weapon sight;
    an anti-cant indicator including a vial containing a bubble;
    a pivot connection connecting the vial to the weapon sight connector, the pivot connection being configured to permit movement of the vial with respect to the weapon sight connector and the weapon sight about a pivot axis of the pivot connection between an operational position in which the bubble can be referenced by a user for indicating orientation of the weapon sight with respect to vertical, and a stowed position different from the operational position;
    wherein the pivot axis of the pivot connection extends in a rearward-to-forward orientation with respect to the weapon sight connector.

17. The anti-cant indicator assembly as set forth in claim 16, wherein the pivot axis of the pivot connection is transverse to a longitudinal axis of the vial.

18. The anti-cant indicator assembly as set forth in claim 16, wherein the pivot axis is arranged with respect to the weapon sight connector such that when the weapon sight connector is mounted on the weapon sight the pivot axis extends generally parallel with a longitudinal sighting axis of the weapon sight.

19. The anti-cant indicator assembly as set forth in claim 16, wherein the pivot axis is arranged with respect to the weapon sight connector such that when the weapon sight connector is mounted on the weapon sight the level is pivotable downward and laterally with respect to the weapon sight to move the level to the deployed position, and the level is pivotable upward toward the stowed position.

20. The anti-cant indicator assembly as set forth in claim 16, wherein the pivot axis is arranged with respect to the weapon sight connector such that the level is pivotable between the operational and stowed positions in a pivot plane extending transversely with respect to a longitudinal sighting axis of the weapon sight.

21. The anti-cant indicator assembly of claim 1, wherein the retainer is carried by the level and movable with the level as the level moves about the pivot connection.

22. The anti-cant indicator assembly as set forth in claim 11, wherein the pivot connection is disposed below an elevation of a top of the weapon sight connector.

23. The anti-cant indicator assembly as set forth in claim 16, further comprising a weapon connector configured to mount the anti-cant indicator assembly to a weapon, the weapon connector supporting the weapon sight connector, and wherein the pivot axis is disposed below an elevation of a top of the weapon sight connector.

24. The anti-cant indicator assembly of claim 1, wherein in the stowed position the bubble cannot be referenced by the user for indicating orientation of the weapon sight with respect to vertical.

25. The anti-cant indicator assembly of claim 24, wherein the vial is in an upstanding orientation when the level is in the stowed position.

26. The anti-cant indicator assembly of claim 24, wherein the retainer is configured to releasably retain the level in the stowed position.

27. The anti-cant indicator assembly of claim 1, wherein the retainer is configured to releasably retain the level in the operational position and the stowed position.

28. The anti-cant indicator assembly of claim 13, wherein in the stowed position the bubble cannot be referenced by the user for indicating orientation of the weapon sight with respect to vertical.

29. The anti-cant indicator assembly of claim 28, wherein the vial is in an upstanding orientation when the level is in the stowed position.

30. The anti-cant indicator assembly of claim 16, wherein in the stowed position the bubble cannot be referenced by the user for indicating orientation of the weapon sight with respect to vertical.

31. The anti-cant indicator assembly of claim 30, wherein the vial is in an upstanding orientation when the level is in the stowed position.

32. The anti-cant indicator assembly of claim 1, wherein the level is configured to pivot less than 180 degrees about a pivot axis of the pivot connection as the level moves from the operational position to the stowed position.

33. The anti-cant indicator assembly of claim 32, wherein the level is configured to pivot 90 degrees about the pivot axis as the level moves from the operational position to the stowed position.

34. The anti-cant indicator assembly of claim 16, wherein the level is configured to pivot less than 180 degrees about the pivot axis as the level moves from the operational position to the stowed position.

35. The anti-cant indicator assembly of claim 34, wherein the level is configured to pivot 90 degrees about the pivot axis as the level moves from the operational position to the stowed position.

36. The anti-cant indicator assembly of claim 1, wherein the weapon sight connector includes a forward portion and a rearward portion, the forward portion arranged to be in front of the rearward portion when the weapon sight connector is mounted on the firearm, wherein the pivot connection defines a pivot axis about which the level pivots between the operational and stowed positions, and wherein the pivot axis extends in a rearward-to-forward orientation with respect to the weapon sight connector.

37. The anti-cant indicator assembly of claim 36, wherein the pivot connection includes a bracket connected to the weapon sight connector, the bracket being selectively movable with respect to the weapon sight connector to change an orientation of the vial with respect to the weapon sight connector in the operation position.

38. The anti-cant indicator assembly of claim 37, wherein the pivot axis of the pivot connection is transverse to a longitudinal axis of the vial.

39. The anti-cant indicator assembly of claim 38, wherein in the stowed position the bubble cannot be referenced by the user for indicating orientation of the weapon sight with respect to vertical.

40. The anti-cant indicator assembly of claim 39, wherein the retainer is carried by the level and movable with the level as the level moves about the pivot connection, and wherein the retainer is configured to releasably retain the level in the operational position and the stowed position.

* * * * *